United States Patent
Ichishi et al.

(10) Patent No.: US 6,949,021 B2
(45) Date of Patent: Sep. 27, 2005

(54) VEHICLE AIR CONDITIONER AND VEHICLE VENTILATION SYSTEM

(75) Inventors: Yoshinori Ichishi, Kariya (JP); Tatsumi Kumada, Gamagori (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/779,574

(22) Filed: Feb. 13, 2004

(65) Prior Publication Data

US 2004/0185764 A1 Sep. 23, 2004

(30) Foreign Application Priority Data

Feb. 24, 2003 (JP) ........................................ 2003-046124

(51) Int. Cl.$^7$ ................................................. B60H 1/00
(52) U.S. Cl. ........................... 454/75; 62/186; 165/288; 236/49.3
(58) Field of Search ........................ 454/75; 236/91 E, 236/51, 49.3; 62/186; 165/202, 288, 291

(56) References Cited

U.S. PATENT DOCUMENTS

| | | | | |
|---|---|---|---|---|
| 6,202,934 B1 | * | 3/2001 | Kamiya et al. | ........... 236/91 C |
| 6,397,615 B1 | * | 6/2002 | Kawai et al. | ................. 62/244 |
| 6,550,686 B2 | * | 4/2003 | Kawai et al. | .............. 236/49.3 |
| 6,659,358 B2 | * | 12/2003 | Kamiya et al. | ............ 236/49.3 |
| 6,698,262 B2 | * | 3/2004 | Wittwer | ........................ 70/208 |
| 2001/0039806 A1 | * | 11/2001 | Kawai et al. | .................. 62/229 |

FOREIGN PATENT DOCUMENTS

| | | | | |
|---|---|---|---|---|
| JP | 01167551 A | * | 7/1989 | ............ F24F/11/02 |
| JP | 5-193349 | * | 8/1993 | |
| JP | 10-278564 | * | 10/1998 | |
| JP | 2000-142089 | | 5/2000 | |
| JP | 2002-264635 | * | 9/2002 | |

* cited by examiner

*Primary Examiner*—Harold Joyce
(74) *Attorney, Agent, or Firm*—Harness, Dickey & Pierce, PLC (57) ABSTRACT

In a vehicle air conditioner, a non-contact temperature sensor is used as an inside air temperature sensor for detecting a temperature in a passenger compartment. Based on infrared rays radiated from a predetermined area of the passenger compartment, the non-contact temperature sensor detects a surface temperature in the predetermined area in non-contact. Therefore, it is not necessary to blow air from the passenger compartment to the inside air temperature sensor in order to detect the temperature in the passenger compartment. Thus, energy consumption can be reduced while the temperature in the passenger compartment can be accurately detected. Accordingly, while the vehicle stops, the vehicle air conditioner can accurately determine whether air conditioning control by an air conditioning unit needs be started while energy consumption can be reduced.

20 Claims, 7 Drawing Sheets

VEHICLE AIR CONDITIONER AND VEHICLE VENTILATION SYSTEM

CROSS REFERENCE TO RELATED APPLICATION

This application is base on Japanese Patent Application No. 2003-46124 filed on Feb. 24, 2003, the disclosure of which is incorporated herein by reference.

BACKGROUND OF THE INVENTION

1. Field of the Invention

The present invention relates to a vehicle air conditioner and a vehicle ventilation system, which are operated while a vehicle stops.

2. Description of Related Art

An automatic ventilation system for a vehicle, which is used while the vehicle stops, is proposed in JP-A-2000-142089. In this system, a temperature sensor is used in order to detect a temperature in a passenger compartment. If the detected temperature is higher than a predetermined value, a blower is automatically operated and ventilates the passenger compartment.

Generally, a dashboard is heated by sunlight entering into the passenger compartment, for example, in the daytime in summer. Thus, if a thermistor inside the dashboard is used as the temperature sensor, the heated dashboard affects a temperature detection of the thermistor because an air temperature inside the dashboard increases.

In order to detect a temperature in the passenger compartment correctly, it is possible to blow air toward the temperature sensor by a blower whenever the temperature sensor detects a temperature. However, in this case, large energy is consumed because the blower is operated. Therefore, if the ventilation system ventilates the passenger compartment for a long time while the vehicle stops, all energy of a battery may be spent.

SUMMARY OF THE INVENTION

In view of the foregoing problems, it is an object of the present invention to provide a vehicle ventilation system which reduces energy consumption and accurately determines a timing to start ventilating a passenger compartment while a vehicle stops.

It is another object of the present invention to provide a vehicle air conditioner which reduces energy consumption and accurately determines a timing to start air conditioning control of a passenger compartment while a vehicle stops.

According to an aspect of the present invention, a vehicle ventilation system includes a ventilating unit, a non-contact temperature sensor and a ventilation determining means. The ventilating unit ventilates a passenger compartment while a vehicle stops. The non-contact temperature sensor detects infrared rays radiated from a predetermined area of the passenger compartment in non-contact and determines a surface temperature of the predetermined area based on the infrared rays. The ventilation determining means determines whether a ventilation by the ventilating unit is started based on the surface temperature detected by the non-contact temperature sensor. Because the non-contact temperature sensor is used in the vehicle ventilation system according to the present invention. Therefore, it is not necessary to blow air from the passenger compartment to the non-contact temperature sensor when a temperature in the passenger compartment is detected. Thus, energy consumption due to air blowing can be prevented while the temperature in the passenger compartment can be accurately detected. Accordingly, the vehicle ventilation system can accurately determine the timing to start ventilating by the ventilating unit while energy consumption can be reduced.

According to an another aspect of the present invention, an air conditioner for a vehicle includes an air conditioning unit which controls an air condition in a passenger compartment while the vehicle stops, a non-contact temperature sensor which detects infrared rays radiated from a predetermined area of the passenger compartment and detects a surface temperature in the predetermined area in non-contact based on the detected infrared rays, and an air-conditioning determining means which determines whether an air conditioning control by the air conditioning unit needs to be started based on the surface temperature detected by the non-contact temperature sensor. Therefore, the vehicle air conditioner can accurately determines whether air conditioning control by the air conditioning unit needs to be started while energy consumption can be reduced.

Preferably, the ventilation system further includes a reservation means which reserves to perform the ventilation by the ventilating unit in advance. Similarly, the air conditioner includes a reservation means which reserves to perform the air conditioning by the air conditioning unit in advance. Alternatively, the ventilation system or the air conditioner includes a distance determining means for determining a distance between a user and the vehicle. In this case, the distance determining means determines an approach of the user to the vehicle based on the detected distance between the user and the vehicle when the detected distance between the user and the vehicle is smaller than a predetermined value, and the ventilation determining means or the air-conditioning determining means determines whether the ventilation by the ventilating unit or the air conditioning by the air conditioning unit needs to be started when the distance determining means determines the approach of the user.

More preferably, in the ventilation system or the air conditioner, the non-contact temperature sensor detects a surface temperature in the predetermined area including a seat in the passenger compartment in non-contact. Therefore, the ventilation or the air conditioning can be performed to be fitted to the thermal feeling of the passenger.

According to a further aspect of the present invention, a control system for controlling a vehicle air conditioner or a ventilation system while a vehicle is stopped, includes a determining means that determines whether an air conditioning control by an air conditioning unit or a ventilation control by a ventilation unit needs to be started based on a surface temperature detected by a non-contact temperature sensor. Thus, while the vehicle stops, the control system accurately determines a timing to start the air conditioning control or the ventilation control of the passenger compartment while energy consumption can be effectively reduced.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

(First Embodiment)

The first embodiment of the present invention will be now described with reference to FIGS. 1–9.

Figure 1:
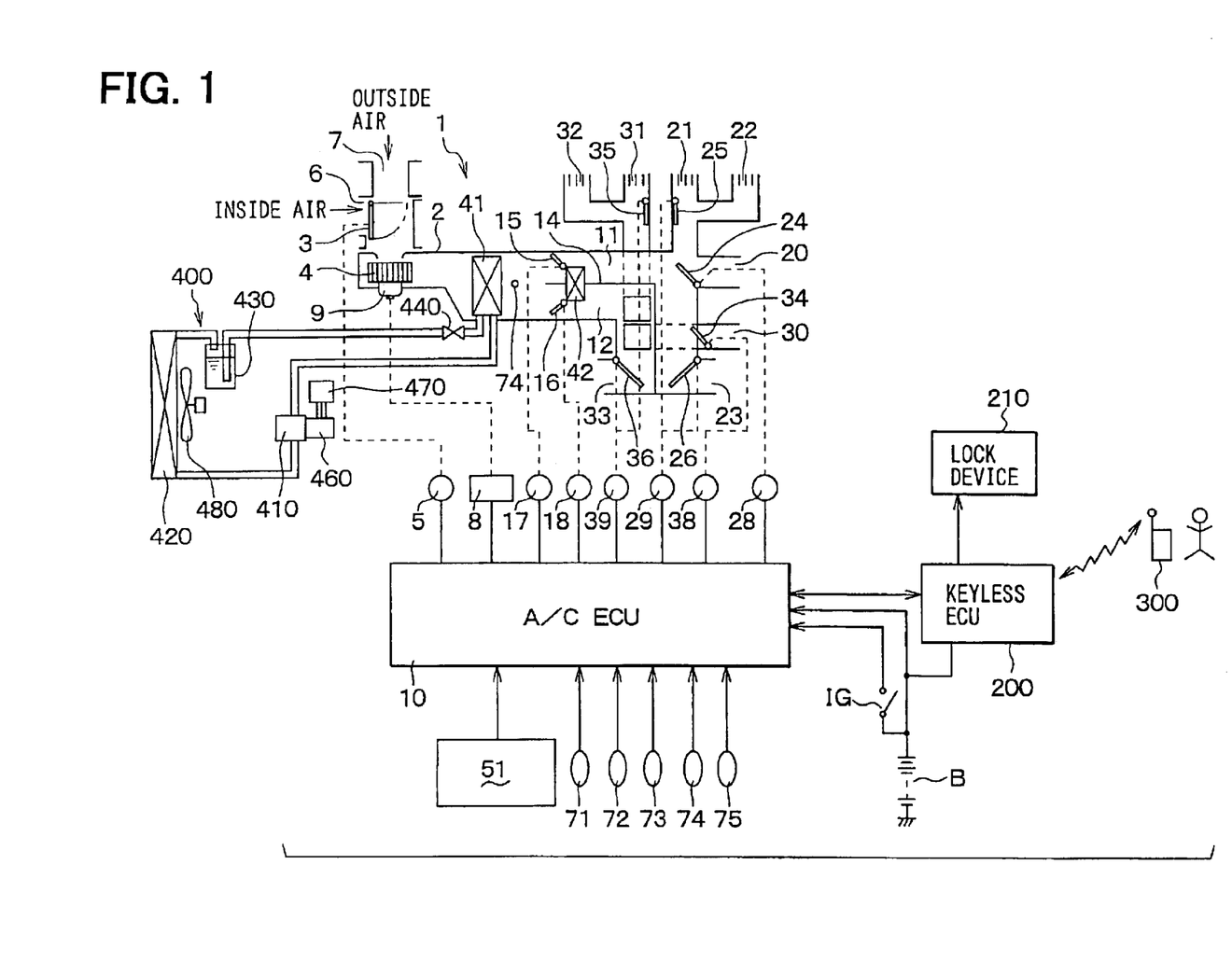
FIG. 1 is a schematic diagram showing an entire system of a vehicle air conditioner according to a first embodiment of the present invention.

In the first embodiment of the present invention, an air conditioner is typically used for performing an air-conditioning in a passenger compartment of a hybrid vehicle which has both an engine and an electric motor for driving. The vehicle air conditioner is an automatic air conditioner which includes an air conditioning unit 1 and an air-conditioning electronic control unit (A/C ECU) 10. The air conditioning unit 1 can independently control an air temperature in a driver-seat side area (e.g., right side area in a right steering wheel) and an air temperature in a passenger-seat side area (e.g., left side area in the right steering wheel). Here, in the vehicle having the right steering wheel, the driver-seat side area includes a rear seat on the right side of the vehicle, and the passenger-seat side area includes a rear seat on the left side of the vehicle. The air conditioning unit 1 can also independently change an air outlet mode in the driver-seat side area and the passenger-seat side area. Further, the A/C ECU 10 controls each actuator in the air conditioning unit 1 so as to control air-conditioning operation of the air conditioning unit 1.

Specifically, the air conditioning unit 1 includes an air duct 2 which is provided on a front side of the passenger compartment. An inside-outside air switching door 3 and a blower 4 are provided on an upstream air side of the air duct 2. The inside-outside air switching door 3 is driven by the actuator (e.g., servo motor 5) and changes an opening degree of each of an inside air introduction port 6 and an outside air introduction port 7.

The blower 4 is a centrifugal electrical blower that is driven and rotated by a blower motor 9 controlled by a blower driving circuit 8. In the air duct 2, the blower 4 generates an air flow toward the passenger compartment.

An evaporator (cooling heat exchanger) 41, which cools air flowing through the air duct 2, is provided in the air duct 2 downstream of the blower 4. Further, a heater core (heating heat exchanger) 42 is provided in the air duct 2 on a downstream air side of the evaporator 41. The heater core 42 heats air flowing therethrough in first and second air passages 11, 12 by exchanging heat with cooling water (hot water) of the engine for driving. Here, the first and second air passages 11, 12 are separated by a division plate 14. Further, a Peltier element can be also used as the evaporator 41 when the air conditioner is used for a vehicle driven by electric power.

A driver-seat side air mixing door (driver-seat side A/M door) 15 and a passenger-seat side air mixing door (passenger-seat side A/M door) 16 are provided on an upstream air side of the heater core 42. The driver-seat side A/M door 15 independently controls an air temperature to be blown into the driver-seat side area of the passenger compartment, and the passenger-seat side A/M door 16 independently controls an air temperature to be blown into the passenger-seat side area of the passenger compartment. The driver and passenger-seat side A/M doors 15, 16 are driven by the actuators (e.g., servo motors 17, 18) and control a temperature of conditioned air blowing from driver and passenger-seat side air outlets to the driver and passenger-seat side areas respectively. More particularly, the temperature of conditioned air blown toward inner surfaces of front windshield on the driver and passenger-seat sides are respectively controlled. The driver and passenger-seat side air outlets will be explained below.

Here, the evaporator 41 according to the first embodiment of the present invention is a part of a refrigerant cycle 400 and evaporates refrigerant which is decompressed and expanded by an expansion valve 440. Further, the refrigerant cycle 400 includes an electric compressor 410, a condenser 420, a gas-liquid separator 430, the above-described expansion valve 440 and refrigerant piping which connects the above-described parts circularly. In the refrigerant cycle 400, refrigerant discharged from the electric compressor 410 flows into the condenser 420 to be liquefied and condensed. Then, the gas-liquid separator 430 separates the liquefied and condensed refrigerant from the condenser 420 into gas refrigerant and liquid refrigerant, so that only the liquid refrigerant flows downstream. Then, the expansion valve 440 decompresses and expands the liquid refrigerant from the gas-liquid separator 430.

In the refrigerant cycle 400, the electric compressor 410 compresses and discharges refrigerant. The electric compressor 410 includes an electric motor 460 and an inverter 470. The electric motor 460 drives the electric compressor 410. For example, a three-phase induction motor is used as the electric motor 460. The inverter 470, to which a battery B supplies electric power, changes a rotation speed of the electric motor 460 according to a driving frequency calculated by the A/C ECU 10.

Accordingly, the electric compressor 410 changes the amount of refrigerant discharged from its discharge port to the condenser 420 by changing a rotation speed of the electric motor 460. Thus, a cooling capacity of the evaporator 41 can be controlled by controlling the amount of refrigerant circulated in the refrigerant cycle 400, that is, the amount of refrigerant flowing into the evaporator 41.

A driver-seat side defroster air outlet 20, a driver-seat side center-face air outlet 21, a driver-seat side side-face air outlet 22 and a driver-seat side foot air outlet 23 are opened at downstream ends of air ducts connected to a downstream air side of the first air passage 11 (FIG. 1).

Further, a passenger-seat side defroster air outlet 30, a passenger-seat side center-face air outlet 31, a passenger-seat side side-face air outlet 32 and a passenger-seat side foot air outlet 33 are opened at downstream ends of air ducts connected to a downstream air side of the second air passage 12 (FIG. 1). Here, the driver and passenger-seat side defroster air outlets 20, 30 are air outlets for blowing conditioned air (mainly, warm air) to the front windshield at the right and left sides. The right and left side side-face air outlets 22, 32 are air outlets for blowing conditioned air (mainly, warm air) to right and left side windowpanes.

Then, driver and passenger-seat side air-outlet mode switching doors 24–26, 34–36 are provided in the first and second air passage 11, 12. The air outlet mode on each of the driver and passenger-seat sides can be set independently by using these doors 24–26, 34–36. Further, these doors 24–26, 34–36 are driven by the actuators (e.g., servo motors 28, 29, 38, 39). Here, the vehicle air conditioner has a face mode, a bi-level mode, a foot mode and a defroster mode, for example, as the air outlet mode on the driver-seat side and the air outlet mode on the passenger-seat side.

The A/C ECU 10 is supplied with DC power from the battery B and performs some control operation, such as air conditioning control in the passenger compartment while the vehicle drives and air conditioning control in the passenger compartment while the vehicle stops. The control while the vehicle stops will be described below. As shown in FIG. 1, the A/C ECU 10 receives switching signals from operation switches on an air-conditioning operation pane 151 integrally provided in a dashboard 50. Further, the A/C ECU 10 receives sensor input signals from sensors described below.

Figure 2:
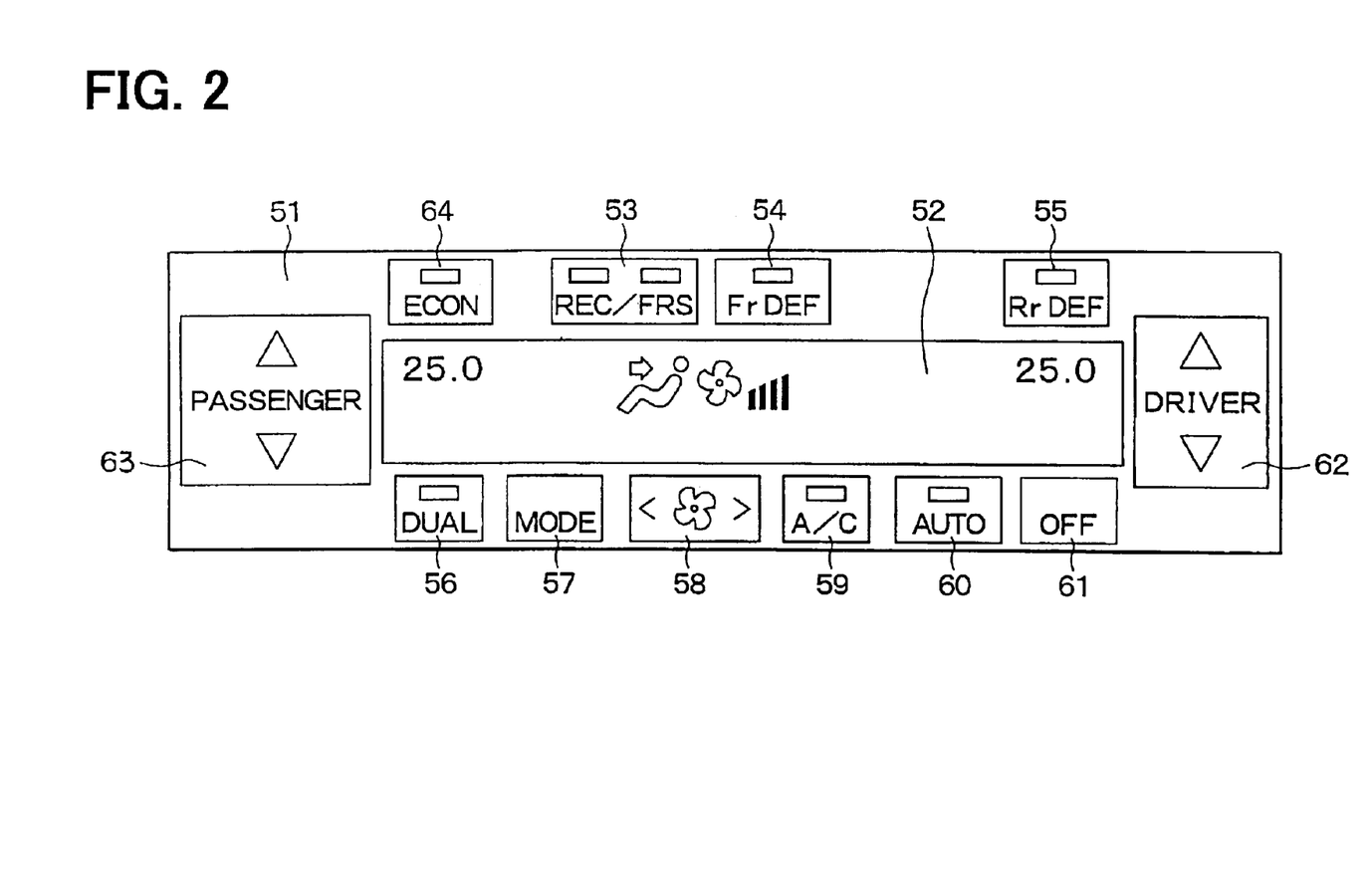
FIG. 2 is a front view showing an air-conditioning operation panel in FIG. 1.

As shown in FIG. 2, the air-conditioning operation panel 51 has a liquid crystal display 52, an inside-outside air selecting switch 53, a front defroster switch 54, a rear defroster (defogger) switch 55, a DUAL switch 56, an air outlet mode selecting switch 57, a blower air amount setting switch 58, an A/C switch 59, an AUTO switch 60, an OFF switch 61, a driver-seat side air temperature setting switch 62, a passenger-seat side air temperature setting switch 63 and a fuel consumption improving switch 64, etc.

The air outlet mode selecting switch 57 is used for setting the air outlet mode to any one of the face mode, the bi-level mode, the foot mode and the defroster mode according to a user manual operation. Further, the air outlet mode selecting switch 57 is used for setting an air-conditioning state while the vehicle stops according to a user manual operation. Here, the air-conditioning state while the vehicle stops is indicated by a controlling level ("strong", "weak", "no setting") of air-conditioning in the passenger compartment.

Further, the driver-seat side air temperature setting switch 62 is used for setting a temperature in the driver-seat side area of the passenger compartment to a desired temperature. The passenger-seat side air temperature setting switch 63 is used for setting a temperature in the passenger-seat side area of the passenger compartment to a desired temperature.

The A/C ECU 10 is connected with a driver-seat side inside air temperature sensor 71, a passenger-seat side inside air temperature sensor 72, an outside air temperature sensor 73 and a post-evaporator temperature sensor 74 and a water temperature sensor 75. The driver-seat side inside air temperature sensor 71 detects an inside air temperature in the driver-seat side area, and the passenger-seat side inside air temperature sensor 72 detects an inside air temperature in the passenger-seat side area. The outside air temperature sensor 73 detects an outside air temperature. The post-evaporator temperature sensor 74 detects a temperature of air blown immediately from the evaporator 41. The water temperature sensor 75 detects a temperature of engine cooling water.

Figure 3:
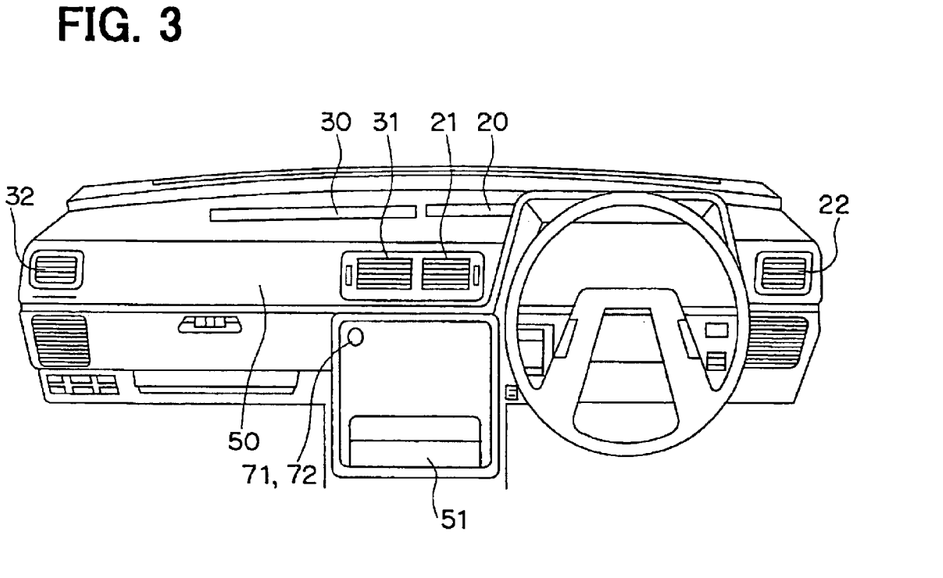
FIG. 3 is a front view showing an arrangement of inside air temperature sensors in FIG. 1.
Figure 4:
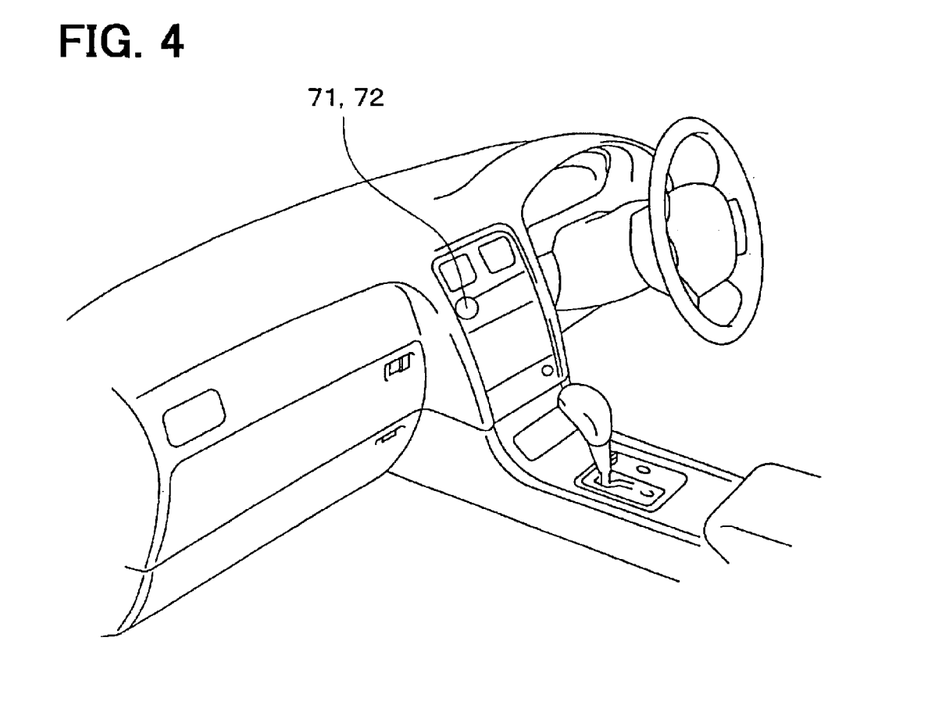
FIG. 4 is a perspective view showing the arrangement of the inside air temperature sensors in FIG. 1.

Here, the inside air temperature sensors 71, 72 are arranged integrally in the dashboard 50 as shown in FIGS. 3 and 4. The driver-seat side inside air temperature sensor 71 detects a temperature in an area R1 (FIG. 5) including a seat surface on the driver-seat side in non-contact. Further, the driver-seat side inside air temperature sensor 71 has a sensor element which is arranged so that a light receiving surface points to the area R1. The sensor element of the driver-seat side inside air temperature sensor 71 outputs an electric signal according to a quantity of infrared rays radiated from the area R1.

The passenger-seat side inside air temperature sensor 72 detects a temperature in an area R2 (FIG. 5) including a seat surface on the passenger-seat side in non-contact. Further, the passenger-seat side inside air temperature sensor 72 has a sensor element which is arranged so that a light receiving surface points to the area R2. The sensor element of the passenger-seat side inside air temperature sensor 72 outputs an electric signal according to a quantity of infrared rays radiated from the area R2.

Here, each of the inside air temperature sensors 71, 72 is a thermo pile type infrared ray sensor. Each of the inside air temperature sensors 71, 72 includes a temperature sensor (not shown) for detecting an absolute temperature of each inside air temperature sensor itself. Further, a temperature sensing element (e.g., thermistor) is used for each of the outside air temperature sensor 73, the post-evaporator temperature sensor 74 and the water temperature sensor 75.

Further, the A/C ECU 10 is connected with a keyless ECU 200. The keyless ECU 200 automatically transmits a transmitting signal by a radio-wave at certain intervals. An electronic key 300 transmits a returning signal whenever it receives the transmitting signal from the keyless ECU 200.

For example, if a user having the electronic key 300 comes to the vehicle to get on, the keyless ECU 200 unlocks a vehicle door by using a lock device 210 because the keyless ECU 200 receives the returning signal from the electronic key 300. Further, if the user having the electronic key 300 goes away from the vehicle beyond a certain distance, the electronic key 300 does not receive the transmitting signal from the keyless ECU 200 and does not transmit the returning signal to the keyless ECU 200. That is, no signal is exchanged between the keyless ECU 200 and the electronic key 300. If this situation continues for a certain period, the keyless ECU 200 locks the door.

Next, as an example of operation according to the first embodiment of the present invention, an air conditioning control of the A/C ECU 10 while the vehicle stops will be described below with reference to FIG. 6.

Figure 6:
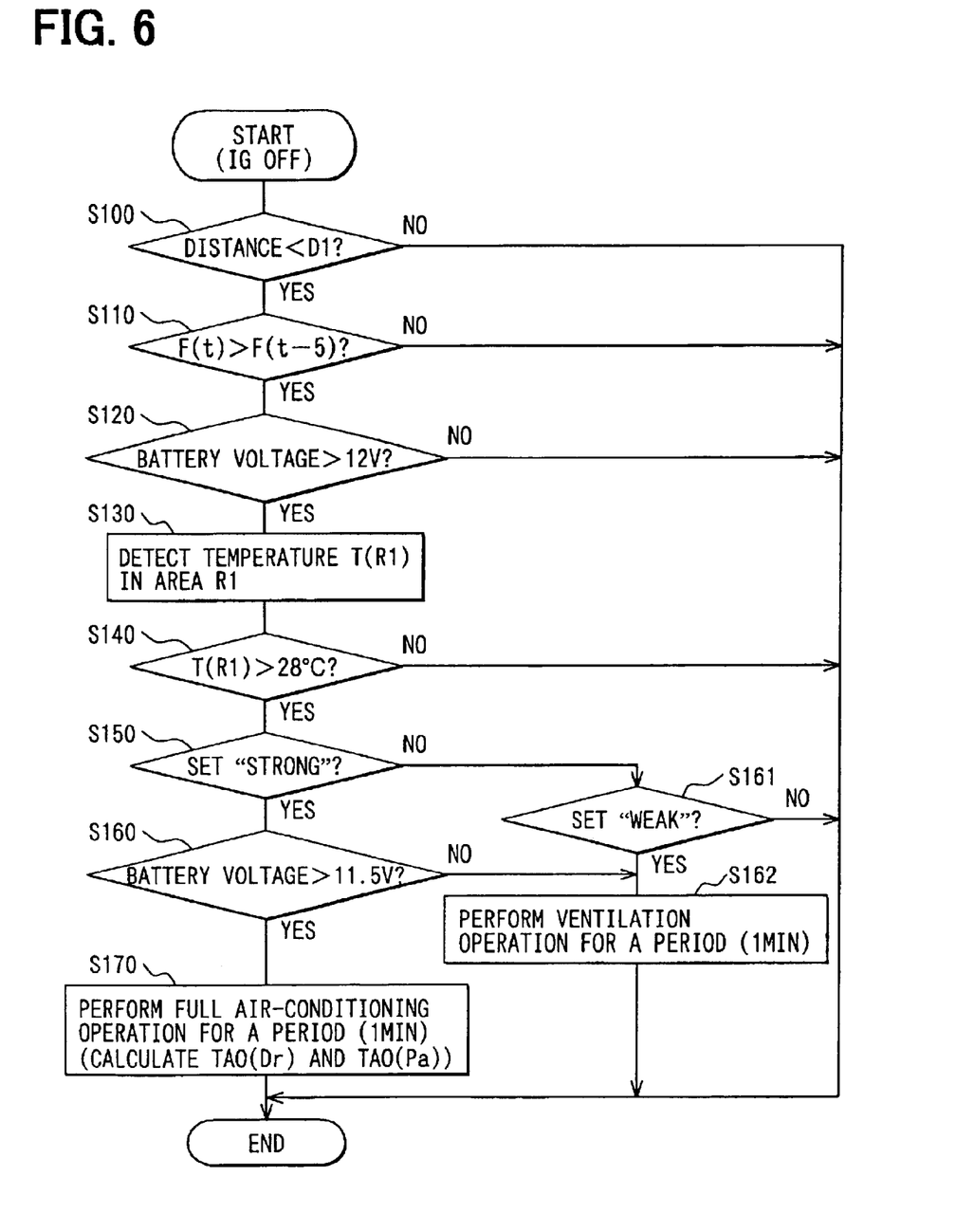
FIG. 6 is a flowchart showing an air-conditioning operation of an A/C ECU in FIG. 1 in the first embodiment of the present invention.
Figure 7:
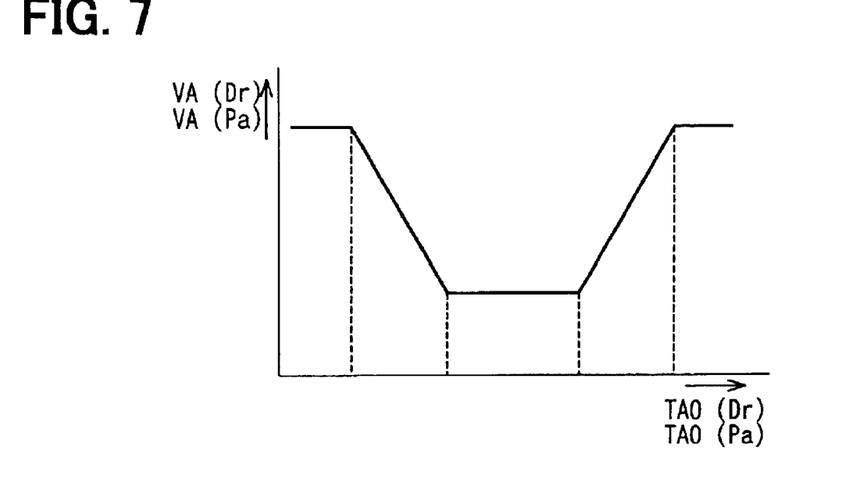
FIG. 7 is a characteristic graph for determining blower voltage in the first embodiment of the present invention.

The A/C ECU 10 performs air conditioning control operation according to a flowchart in FIG. 6. The air conditioning control operation starts when an ignition switch IG is switched off and is repeated at certain intervals (e.g., 250 msec). The ignition switch IG is used for giving permission to supply electric power to a driving equipment such as the engine and the electric motor.

Firstly, the A/C ECU 10 determines whether a distance between the user and the vehicle is smaller than a certain distance D1 (e.g., 50 m) or not (S100). For example, the A/C ECU 10 determines received power of the returning signal received on the keyless ECU 200 and determines whether the received power is larger than a predetermined power P. When the received power is larger than the predetermined power P, the A/C ECU 10 determines that the distance between the user and the vehicle is smaller than the certain distance D1, and the determination at step S100 is "YES".

The received power is referred to as F(t) below, and "t" indicates time (multiples of 250 msec).

Next, the A/C ECU 10 determines whether the user comes to the vehicle or not (S110). For example, the A/C ECU 10 compares a received power F(t) at the present time and a received power F(t−5) at the time before 5 seconds from the present time. When the received power F(t) is larger than the received power F(t−5), the A/C ECU 10 determines that the user comes to the vehicle, and the determination at step S110 is "YES".

Next, the A/C ECU 10 determines whether a terminal voltage (battery voltage) of the battery B is larger than 12 V or not (S120). That is, the A/C ECU 10 determines whether capacity of the battery B is sufficient or not for controlling an air condition in the passenger compartment while the vehicle stops, that is, when a vehicle generator does not generate.

When the terminal voltage of the battery B is larger than 12 V, the A/C ECU 10 determines that capacity of the battery B is sufficient. Then, the A/C ECU 10 receives a driver-seat side temperature (i.e., temperature T(R1) detected by an infrared ray sensor in the driver-seat side area R1) from the driver-seat side inside air temperature sensor 71 (S130). Next, in order to determine a timing to start the air conditioning control, the A/C ECU 10 determines whether the detected temperature T(R1) is larger than a predetermined temperature 28° C. (S140). When the detected temperature T(R1) is larger than 28° C., the A/C ECU 10 determines that the air conditioning control needs to be started, and the determination at step S140 is "YES". That is, the A/C ECU 10 determines that the present time is the timing to start the air conditioning control. Further, when the detected temperature T(R1) is smaller than 28° C., the A/C ECU 10 determines that the air conditioning control should not be started, and the determination at step S140 is "NO".

Then, when the determination at step S140 is "YES", the A/C ECU 10 determines whether the air condition setting while the vehicle stops is set to "strong" by the air outlet mode selecting switch 57 (S150).

When the air condition setting while the vehicle stops is "strong", the A/C ECU 10 determines whether the terminal voltage of the battery B is larger than 11.5 V or not (S160). That is, the A/C ECU 10 determines again whether the remaining capacity of the battery B is sufficient or not for performing the air conditioning control in the passenger compartment while the vehicle stops. If the terminal voltage of the battery B is larger than 11.5 V, the A/C ECU 10 determines that the remaining capacity of the battery B is sufficient for performing the air conditioning control. In this case, the A/C ECU 10 starts and performs a full automatic air-conditioning operation (S170). This full automatic air-conditioning operation continues for a predetermined period (e.g., 1 min).

Firstly, in the full automatic air-conditioning operation, the A/C ECU 10 calculates a driver-seat side target air temperature TAO(Dr) and a passenger-seat side target air temperature TAO(Pa).

Specifically, the TAO(Dr) and TAO(Pa) are calculated respectively by using a temperature TIR(Dr) detected by the driver-seat side inside air temperature sensor 71, a temperature TIR(Pa) detected by the passenger-seat side inside air temperature sensor 72, a temperature TSET(Dr) set by the driver-seat side air temperature setting switch 62, a temperature TEST(Pa) set by the passenger-seat side air temperature setting switch 63 and a temperature TAM detected by the outside air temperature sensor 73, in accordance with the following equations 1 and 2.

$$TAO(Dr)=Kset \times TSET(Dr)-Kir \times TIR(Dr)-Kam \times TAM+C \quad \text{(equation 1)}$$

$$TAO(Pa)=Kset \times TSET(Pa)-Kir \times TIR(Pa)-Kam \times TAM+C \quad \text{(equation 2)}$$

where, Kset: temperature setting coefficient (e.g., 7.0)

Kir: infrared ray coefficient (e.g., 5.1)

Kam: outside air temperature coefficient (e.g., 1.0)

C: compensation coefficient (e.g., −45)

Next, the A/C ECU 10 calculates a blower voltage VA, which corresponds to air blowing amount of the blower 4 and is applied to the blower motor 9, based on TAO(Dr) and TAO(Pa) calculated above. Firstly, the A/C ECU 10 calculates blower voltage VA(Dr) and VA(Pa) in order to calculate the blower voltage VA. Specifically, VA(Dr) and VA(Pa) are calculated by using TAO(Dr) and TAO(Pa), respectively based on the characteristic graph in FIG. 7. Then, the blower voltage VA is calculated by averaging VA(Dr) and VA(Pa).

Figure 8:
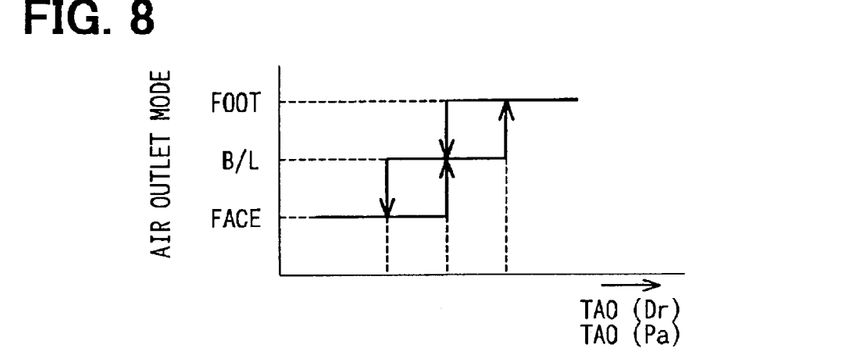
FIG. 8 is a characteristic graph for determining an air outlet mode in the first embodiment of the present invention.

Next, the A/C ECU 10 determines the air outlet mode on each of the driver and passenger-seat sides based on TAO(Dr), TAO(Pa) and the characteristic graph in FIG. 8.

When the A/C ECU 10 determines the face mode as the driver-seat side air outlet mode, only the air outlets 21, 22 are opened. When the foot mode is determined as the driver-seat side air outlet mode, only the air outlet 23 is opened. When the bi-level mode is determined as the driver-seat side air outlet mode, the air outlets 21–23 are opened. Then, when the face mode is determined as the passenger-seat side air outlet mode, only the air outlets 31, 32 are opened. When the foot mode is determined as the passenger-seat side air outlet mode, only the air outlet 33 is opened. When the bi-level mode is determined as the passenger-seat side air outlet mode, the air outlets 31–33 are opened.

Figure 9:
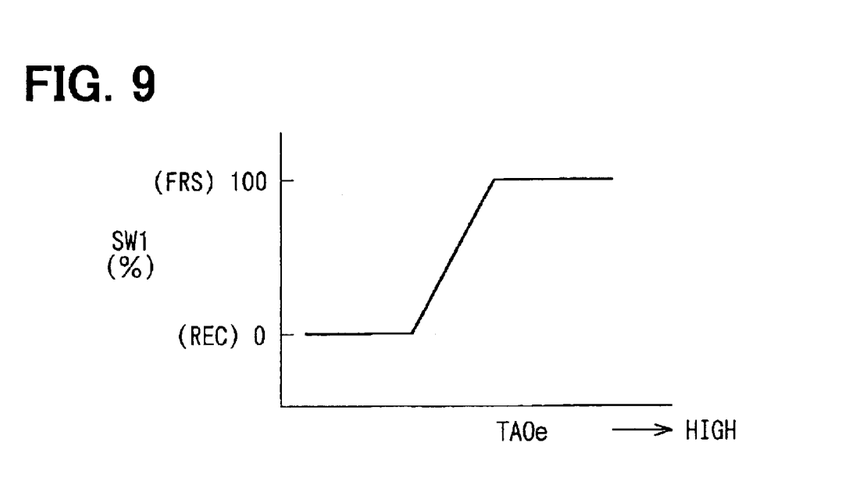
FIG. 9 is a characteristic graph for determining an opening degree of an inside-outside air switching door in the first embodiment of the present invention.

Next, the A/C ECU 10 averages TAO(Dr) and TAO(Pa) calculated above and obtains an average target air temperature TAOe by using a formula of TAOe=(TAO(Dr)+TAO(Pa))/2. Then, based on the TAOe and the characteristic graph in FIG. 9, the A/C ECU 10 determines a target air flow ratio between an inside air amount introduced from the inside air introduction port 6 and an outside air amount introduced from the outside air introduction port 7. That is, the A/C ECU 10 determines a target opening degree SW1 (target operation position) of the inside-outside air switching door 3. In FIG. 9, when the target opening degree SW1 is "100%" (FRS), only outside air is introduced by the inside-outside air switching door 3. To the contrary, when the target opening degree SW1 is "0%" (REC), only inside air is introduced by the inside-outside air switching door 3.

Next, the A/C ECU 10 determines that a driver-seat side A/M door opening degree SW(Dr) (i.e., opening degree of the driver-seat side A/M door 15) is "100%". Further, the A/C ECU 10 determines that a passenger-seat side A/M door opening degree SW(Pa) (i.e., opening degree of the passenger-seat side A/M door 16) is "100%".

Next, the A/C ECU 10 outputs a signal corresponding to the blower voltage VA to the blower driving circuit 8. Further, the A/C ECU 10 outputs control signals which correspond to the air outlet mode, the SW(Dr), the SW(Pa) and the target opening degree of the inside-outside air switching door 3, to corresponding one of the servo motors 5, 17, 18, 28, 29, 38, 39 and the electric motor 460.

In addition, the A/C ECU 10 determines a control value (motor control signal) for controlling the electric motor 460 of the electric compressor 410 based on a temperature detected by the post-evaporator temperature sensor 74. The amount of refrigerant flowing into the evaporator 41 is changed by controlling the electric motor 460 of the electric compressor 410 based on the determined motor control value. Thus, the temperature detected by the post-evaporator temperature sensor 74 can be adjusted to a target temperature.

As described above, the air condition in the passenger compartment is controlled by the operation of each of the electric motor 460 of the electric compressor 410 and the servo motors.

Further, when the air condition setting while the vehicle stops is not "strong" (determination at step S150 is "NO" in FIG. 6) and is "weak" (determination at step S161 is "YES"), a ventilation operation is performed (S162). Further, this ventilation operation continues for a predetermined period (e.g., 1 min).

In this case, the A/C ECU 10 determines the target opening degree of the inside-outside air switching door 3 so that an inside air amount introduced from the inside air introduction port 6 is "0%" (full close) and an outside air amount introduced from the outside air introduction port 7 is "100%" (full open). That is, in the ventilation operation, the inside-outside air switching door 3 fully closes the inside air introduction port 6 and fully opens the outside air introduction port 7, so that the passenger compartment is ventilated by outside air. The A/C ECU 10 outputs a control signal corresponding to the determined target opening degree to the servo motor 5.

Further, the A/C ECU 10 outputs a predetermined signal corresponding to the blower voltage VA to the blower driving circuit 8.

In addition, in the ventilation operation, the A/C ECU 10 determines the bi-level mode as the air outlet mode on each of the driver and passenger-seat sides and outputs a control signal corresponding to the determined air outlet mode to the servo motors 17, 18, 28, 29, 38, 39.

As described above, outside air is introduced in the passenger compartment and the ventilation operation is performed by operating each of the servo motors 5, 17, 18, 28, 29, 38, 39 and the electric motor 460.

Further, when the air condition setting while the vehicle stops is not either the "strong" or the "weak" at step S161, either the ventilation operation or the air-conditioning operation is not performed in the passenger compartment.

Next, advantages of the vehicle air conditioner according to the first embodiment of the present invention will be described below.

Figure 5:
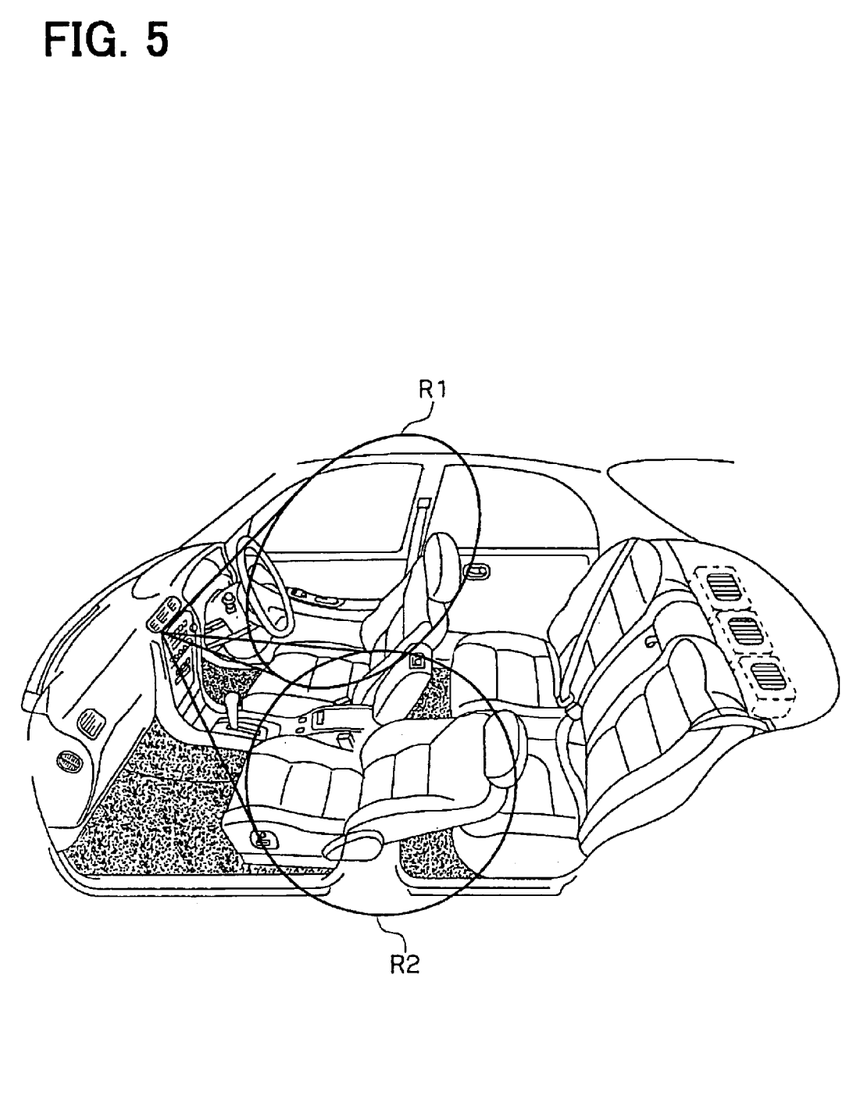
FIG. 5 is a perspective view showing a detection area of each of the inside air temperature sensors in a passenger compartment.

(1) The non-contact temperature sensors 71, 72 are used as the inside air temperature sensors. Further, based on the infrared rays radiated from each of the driver and passenger-seat side areas R1, R2, each of these sensors 71, 72 detects a surface temperature in corresponding one of the areas R1, R2 in non-contact. Therefore, it is not necessary to blow air from the passenger compartment to each of the non-contact temperature sensors 71, 72 in order to detect an air temperature in the passenger compartment by using each of the sensors 71, 72.

Thus, energy consumption due to air blowing can be reduced while the temperature in the passenger compartment can be accurately detected. Accordingly, the vehicle air conditioner can accurately determine a timing to start air-conditioning by the air conditioning unit 1 while the energy consumption can be effectively prevented. Thus, a temperature rise can be prevented in the passenger compartment while energy consumption can be reduced.

(2) In the vehicle air conditioner according to the first embodiment of the present invention, the ventilation operation is performed in case where the air-conditioning while the vehicle stops is set to "weak", even if the temperature detected by the driver-seat side inside air temperature sensor 71 is higher than 28° C. That is, the driver-seat side inside air temperature sensor 71 is used for determining whether the ventilation due to the air conditioning unit 1 needs to be started or not, that is, for determining a timing to start the ventilation operation. Accordingly, the vehicle air conditioner can accurately determine the timing to start ventilation operation due to the air conditioning unit 1 while energy consumption can be reduced.

(3) The air outlet mode selecting switch 57 is provided to select the controlling level of air condition among the "strong", the "weak", the "no setting" in advance. Therefore, the air condition in the passenger compartment can be controlled so as to fit a passenger's preference before the user gets on the vehicle. Especially, if the controlling level of air condition is set to the "weak", it is possible to reserve the ventilation operation due to the air conditioning unit 1. Therefore, it is useful for a user who prefers only ventilation.

(4) If a distance between the user and the vehicle is smaller than a certain distance D1 and the user comes to the vehicle, the vehicle air conditioner determines whether the air conditioning control by the air conditioning unit 1 should be started or not. Therefore, the air conditioning control is performed only when possibility of approach of the user is high. Accordingly, energy consumption can be minimized because the air conditioning control is performed only when it is necessary.

(5) Generally, a passenger is especially sensitive to a temperature of a seat when the passenger sits on the seat. In the first embodiment, each of the inside air temperature sensors 71, 72 is the non-contact temperature sensor which detects the surface temperature of corresponding one of areas including the driver and passenger seats in non-contact. Therefore, the vehicle air conditioner determines the start operation of the air conditioning control due to the air conditioning unit 1 to be fitted to a passenger's thermal feeling.

Further, the on-off control of the ventilation operation of the passenger compartment is performed in the vehicle air conditioner according to the first embodiment of the present invention. However, for example, strong-weak control of a ventilating capacity can be also performed in a ventilation system which ventilates a passenger compartment normally.

(Second Embodiment)

In the above-described first embodiment of the present invention, one of the ventilation operation and the air-conditioning operation can be selected for setting the air-conditioning state while the vehicle stops by the air outlet mode selecting switch 57. To the contrary, only the ventilation operation can be performed in a vehicle air conditioner according to the second embodiment of the present invention.

Figure 10:
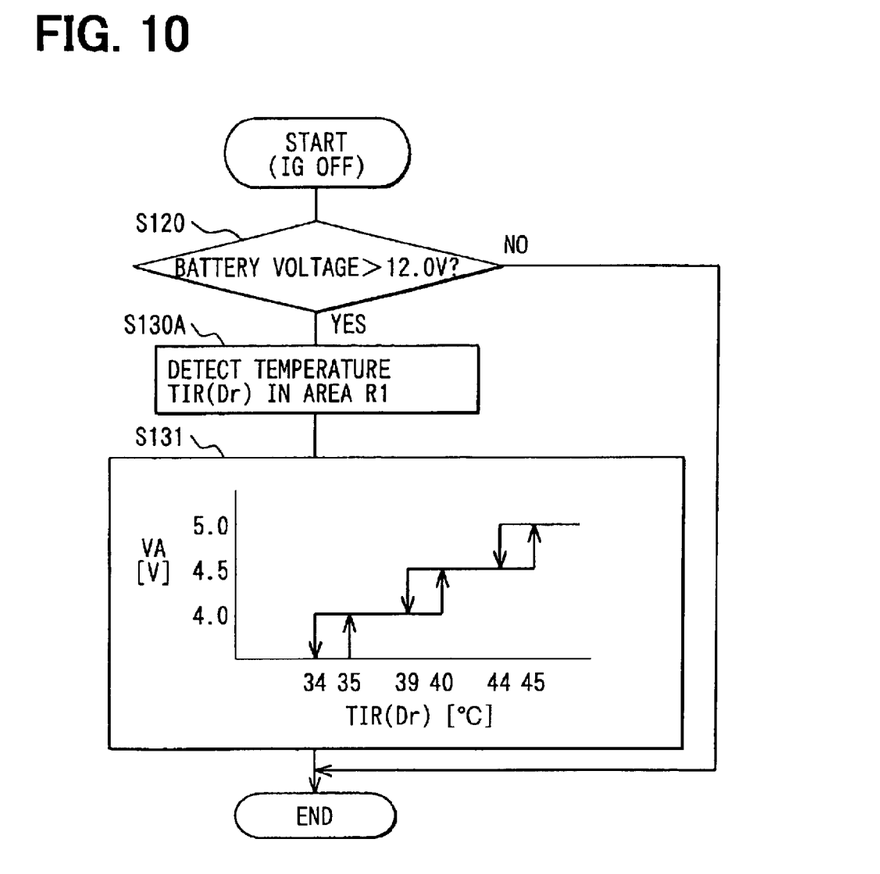
FIG. 10 is a flowchart showing an air-conditioning operation of an A/C ECU according to a second embodiment of the present invention.

In the second embodiment, the A/C ECU 10 performs air conditioning control operation according to the flowchart in FIG. 10. The air conditioning control operation starts when the ignition switch IG is switched off and is repeated at certain intervals (e.g., 60 msec).

Firstly, the A/C ECU 10 determines whether the terminal voltage (battery voltage) of the battery B is larger than 12 V or not (S120). When the terminal voltage of the battery B is larger than 12 V, the A/C ECU 10 receives a driver-seat side temperature TIR(Dr) detected by the driver-seat side inside air temperature sensor 71 (S130A). The blower voltage VA is determined based on the detected temperature TIR(Dr) (i.e., temperature detected by the infrared ray sensor at the driver-seat side) and the characteristic graph shown in FIG. 10. That is, the blower voltage VA increases stepwisely as the temperature TIR(Dr) detected by the driver-seat side inside air temperature sensor 71 increases.

Further, the A/C ECU 10 determines the target opening degree of the inside-outside air switching door 3 so that an air amount introduced from the inside air introduction port 6 is "0%" (full close) and an air flow introduced from the outside air introduction port 7 is "100%" (full open). The A/C ECU 10 outputs a control signal corresponding to the determined target opening degree to the servo motor 5.

In addition, the A/C ECU 10 determines the bi-level mode as the air outlet mode on each of the driver and passenger-seat sides and outputs a control signal corresponding to the determined air outlet mode to the servo motors 17, 18, 28, 29, 38, 39.

As described above, outside air is introduced in the passenger compartment and the ventilation operation is performed by operating each of the servo motors 5, 17, 18, 28, 29, 38, 39 and the electric motor 460.

As described above, in the vehicle air conditioner according to the second embodiment of the present invention, the blower voltage VA increase stepwisely as the temperature TIR(Dr) detected by the driver-seat side inside air temperature sensor 71 increases. Accordingly, the amount of blown air increases stepwisely as the temperature detected by the driver-seat side inside air temperature sensor 71 increases. Therefore, air condition in the passenger compartment can be finely controlled according to the detected temperature in the passenger compartment.

Although the present invention has been fully described in connection with the preferred embodiments thereof with reference to the accompanying drawings, it is to be noted that various changes and modifications will become apparent to those skilled in the art. For example, in the above-described second embodiment, the blower voltage VA can be controlled to increase continuously as the temperature TIR (Dr) detected by the infrared ray sensor at the driver side increases.

In the above-described embodiments, the air outlet mode selecting switch 57 is used as a reservation means for reserving the ventilation operation and a selecting means for selecting an air-conditioning level. However, the other devices can be used as the reservation means and the selecting means. Further, in the above-described embodiments, the air conditioning unit 1 corresponds to each of a ventilating unit and an air conditioning unit of the present invention.

Such changes and modifications are to be understood as being included within the scope of the present invention as defined by the appended claims.

What is claimed is:

1. A ventilation system for a vehicle, comprising:
   a ventilating unit which performs a ventilation of a passenger compartment using power from a battery of the vehicle while the vehicle is stopped in a vehicle state where the battery is disconnected from a driving source of the vehicle, and no passenger exists in the vehicle;
   a non-contact temperature sensor which detects infrared rays radiated from a predetermined area of the passenger compartment and detects a surface temperature in the predetermined area by non-contact based on the detected infrared rays, using the power of the battery disconnected from the driving source;
   ventilation determining means for determining whether the ventilation by the ventilating unit needs to be started based on the surface temperature detected by the non-contact temperature sensor using the power of the battery disconnected from the driving source; and
   when the determining means determines that the ventilation by the ventilating unit needs to be started, the ventilating unit performs the ventilation using the power of the battery that is disconnected from the driving source of the vehicle.

2. The ventilation system according to claim 1, further comprising:
   reservation means for reserving performance of the ventilation by the ventilating unit in advance.

3. The ventilation system according to claim 1, further comprising distance determining means for determining a distance between a user and the vehicle, wherein:
   the distance determining means determines an approach of the user to the vehicle based on the detected distance between the user and the vehicle when the detected distance between the user and the vehicle is smaller than a predetermined value; and
   the ventilation determining means determines whether the ventilation by the ventilating unit needs to be started, when the distance determining means determines the approach of the user.

4. The ventilation system according to claim 1, wherein the non-contact temperature sensor detects the surface temperature in the predetermined area including a seat where no passenger exists in the passenger compartment.

5. The ventilation system according to claim 1, wherein the ventilation determining means determines whether a switch for giving permission to supply electric power to the driving source of the vehicle is switched off, and whether the ventilation needs to be started when the switch is switched off; and
   when the determining means determines that the ventilation needs to be started when the switch is switched off, the ventilating unit performs the ventilation using the power of the battery that is disconnected from the driving source of the vehicle.

6. The ventilation system according to claim 1, further comprising:
   battery capacity determining means for determining whether capacity of the battery is larger than a predetermined level; and
   ventilation starting means for starting the ventilation in the passenger compartment when the battery capacity determining means determines that the capacity of the battery is larger than the predetermined level and the ventilation determining means determines that the ventilation needs to be started.

7. The ventilation system according to claim 1, wherein the ventilating unit performs the ventilation while the driving source is stopped.

8. The ventilation system according to claim 6, wherein the predetermined level is between a first level necessary for vehicle operation and a second level which is full capacity for the battery.

9. An air conditioner for a vehicle, comprising:
   an air conditioning unit which controls an air condition in a passenger compartment using power from a battery of the vehicle while the vehicle is stopped in a vehicle state where the battery is disconnected from a driving source of the vehicle, and no passenger exists in the vehicle;
   a non-contact temperature sensor which detects infrared rays radiated from a predetermined area of the passenger compartment and detects a surface temperature in the predetermined area by non-contact based on the detected infrared rays, using the power of the battery disconnected from the driving source;

air-conditioning determining means for determining
whether an air conditioning control by the air conditioning unit needs to be started based on the surface temperature detected by the non-contact temperature sensor using the power of the battery disconnected from the driving source; and when the determining means determines that the air conditioning control by the air conditioning unit needs to be started, the air conditioning unit performs the air conditioning control using the power of the battery that is disconnected from the driving source of the vehicle.

10. The air conditioner according to claim 9, further comprising:
selecting means for selecting a level of the air condition controlled by the air conditioning unit based on the surface temperature and a battery voltage.

11. The air conditioner according to claim 9, further comprising distance determining means for detecting a distance between a user and the vehicle, wherein:
the distance determining means determines an approach of the user to the vehicle based on the detected distance between the user and the vehicle when the distance between the user and the vehicle is smaller than a predetermined value; and
the air-conditioning determining means determines whether the air conditioning control by the air conditioning unit needs to be started, when the distance determining means determines the approach of the user.

12. The air conditioner according to claim 9, wherein the non-contact temperature sensor detects the surface temperature in the predetermined area including a seat where no passenger exists in the passenger compartment.

13. The ventilation system according to claim 9, wherein the air-conditioning determining means determines whether a switch for giving permission to supply electric power to the driving source of the vehicle is switched off, and whether the air conditioning control needs to be started when the switch is switched off; and
when the determining means determines that the ventilation needs to be started when the switch is switched off, the ventilating unit performs the ventilation using the power of the battery that is disconnected from the driving source of the vehicle.

14. The air conditioner according to claim 9, further comprising:
battery capacity determining means for determining whether capacity of the battery is larger than a predetermined level; and
air-conditioning starting means for starting the air conditioning control in the passenger compartment when the battery capacity determining means determines that the capacity of the battery is larger than the predetermined level and the air-conditioning determining means determines that the air conditioning needs to be started.

15. A control system for controlling a vehicle ventilation system, the vehicle ventilation system including a ventilating unit for ventilating a passenger compartment using power from a battery of the vehicle while the vehicle is stopped in a vehicle state where the battery is disconnected from a driving source of the vehicle, and no passenger exists in the vehicle, and a non-contact temperature sensor for detecting infrared rays radiated from a predetermined area and determining a surface temperature of the predetermined area by non-contact based on the detected infrared rays, using the power of the battery disconnected from the driving source, the control system comprising:

determining means for determining whether a ventilating by the ventilating unit needs to be started based on the surface temperature detected by the non-contact temperature sensor using the power of the batter disconnected from the driving source; and when the determining means determines that the ventilation by the ventilating unit needs to be started, the ventilating unit performs the ventilation using the power of the battery that is disconnected from the driving source of the vehicle; and when the determining means determines that the ventilation by the ventilating unit needs to be started, the ventilating unit performs the ventilation for a predetermined time using the power of the battery that is disconnected from the driving source of the vehicle.

16. The control system according to claim 15, wherein the determining means determines whether a switch for giving permission to supply electric power to the driving source of the vehicle is switched off, and whether the ventilation needs to be started when the switch is switched off; and
when the determining means determines that the ventilation needs to be started when the switch is switched off, the ventilating unit performs the ventilation using the power of the battery that is disconnected from the driving source of the vehicle.

17. The control system according to claim 15, further comprising:
battery capacity determining means for determining whether capacity of the battery is larger than a predetermined level while the vehicle stops and a vehicle generator does not generate; and
ventilation starting means for starting the ventilation in the passenger compartment when the battery capacity determining means determines that the capacity of the battery is larger than the predetermined level and the determining means determines that the ventilation needs to be started.

18. A control system for controlling a vehicle air conditioner, the vehicle air conditioner includes an air conditioning unit for controlling air condition in a passenger compartment using power from a battery of the vehicle while a vehicle is stopped in a vehicle state where the battery is disconnected from a driving source of the vehicle, and no passenger exists in the vehicle, and a non-contact temperature sensor for detecting infrared rays radiated from a predetermined area and determining a surface temperature of the predetermined area by non-contact based on the detected infrared rays, using the power of the battery disconnected from the driving source, the control system comprising:

determining means for determining whether an air conditioning control by the air conditioning unit needs to be started based on the surface temperature detected by the non-contact temperature sensor using the power of the battery disconnected from the driving source; and when the determining means determines that the air conditioning control by the air conditioning unit needs to be started, the air conditioning unit performs the air conditioning control using the power of the battery that is disconnected from the driving source of the vehicle; and when the determining means determines that the air conditioning control by the air conditioning unit needs to be started, the air conditioning unit performs the air conditioning control for a predetermined time using the power of the battery that is disconnected from the driving source of the vehicle.

19. The control system according to claim 18, wherein the determining means determines whether a switch for giving permission to supply electric power to the driving source of the vehicle is switched off, and whether the air conditioning control needs to be started when the switch is switched off; and when the determining means determines that the ventilation needs to be started when the switch is switched off, the ventilating unit performs the ventilation using the power of the battery that is disconnected from the driving source of the vehicle.

20. The control system according to claim 18, further comprising:

battery capacity determining means for determining whether capacity of the battery is larger than a predetermined level while the vehicle is stopped and a vehicle generator does not generate; and air-conditioning starting means for starting the air conditioning control in the passenger compartment when the battery capacity determining means determines that the capacity of the battery is larger than the predetermined level and the determining means determines that the air conditioning needs to be started.

* * * * *